United States Patent [19]

McElhinney

[11] Patent Number: 5,675,488
[45] Date of Patent: Oct. 7, 1997

[54] LOCATION DETERMINATION USING VECTOR MEASUREMENTS

[75] Inventor: Graham McElhinney, Inverurle, United Kingdom

[73] Assignee: Halliburton Energy Services, Inc., Houston, Tex.

[21] Appl. No.: 440,152

[22] Filed: May 12, 1995

[30] Foreign Application Priority Data

May 12, 1994 [GB] United Kingdom ................. 9409550

[51] Int. Cl.⁶ .......................... E21B 49/00; E21B 47/12; G01V 1/40
[52] U.S. Cl. .......................... 364/422; 364/559; 324/338; 73/152.1; 73/152.35; 340/853.1; 340/853.2
[58] Field of Search .......................... 364/559, 422, 364/421; 33/304, 312–316; 324/338, 339, 341, 422; 340/853.1, 853.2, 853.5; 73/152.1, 152.35

[56] References Cited

U.S. PATENT DOCUMENTS 5,541,517  7/1996  Hartmann et al. ............. 324/346

FOREIGN PATENT DOCUMENTS 2179455  4/1987  United Kingdom .
2241583  4/1991  United Kingdom .
WO92/13173  6/1992  WIPO .

OTHER PUBLICATIONS

Bosum W. et al. "A gyro-oriented 3-compentent borehole magnetometer for mineral prospecting with examples of its application"; Geophysical Prospecting 36, 933–961 1988.

Jones D. L. "Improved magnetic model for determination of range and direction to a blowout well"; SPE Drill Eng. v 2, n 4, pp. 316–322 Dec. 1987.

Minear, J. W. "Initial results from an acoustic logginf\d-while-drilling tool", Proceedings of the 1996 SPE Annual Technical Conference and Exhibitition, pp. 529–540. Oct. 1996.

Primary Examiner—Emanuel T. Voeltz
Assistant Examiner—Kamini S. Shah

[57] ABSTRACT

A method for locating underground cylindrically symmetrical magnetic sources, particularly boreholes, from magnetic field measurements. The method is based on the shape of magnetic field produced by magnetic materials with cylindrical axes. As the field caused by the magnetic source always points away from or towards its cylindrical axis, lines extended from magnetic field vectors caused by the magnetic source will always pass through the axis. Numerical techniques are used to find the common line to all the extended magnetic field vectors and thus calculate the axis of the magnetic source.

15 Claims, 8 Drawing Sheets

LOCATION DETERMINATION USING VECTOR MEASUREMENTS

The present invention relates to a method of determining from a measurement region, the location of a source of a physical phenomenon.

The invention is particularly suitable for applications where the source is "invisible" from the measurement location such as subterranean ranging. The measurement region could be a well borehole being drilled and the source could be an adjacent well borehole.

Nowadays, it is common practice in oil and gas extraction and exploration for a well to be drilled in the vicinity of an existing well. Sometimes it is desired that the well being drilled should communicate with the existing well. In other applications it is important that the paths of the two wells should not cross. Either way, it is necessary to determine when the path of one well is approaching the path of an adjacent well.

Various techniques have already been proposed for estimating the direction and distance away of an adjacent well. Some of these are so-called "active" techniques which involve causing a signal, such as an electric field, to be generated in the adjacent well which is measurable from the well being drilled. Other so-called "passive" techniques measure other phenomena already available from the existing or "target" well such as magnetic interference due to metal parts in the target well. Most of these earlier techniques are complicated in terms of the measurements they require for ranging the target well and do not always produce accurate results.

It would therefore be desirable to provide a simplified technique for subterranean ranging.

The present invention provides a method of determining from a measurement region the location of a source of a physical phenomenon comprising detecting the direction of the phenomenon as a vector at at least two spatially separated points in the measurement region and finding a line which is intersected by the lines including said vectors.

In the preferred embodiment of the invention, the physical phenomenon is a magnetic field. A drilled well usually contains some magnetically permeable material such as a metal liner extending along the borehole or possibly a drillstring itself. The metal influences the magnetic field which would normally act on an adjacent well (ie: the earth's magnetic field). This influence is generally referred to as "magnetic interference". The metal in the borehole typically behaves as a cylindrical bar magnet having the typical magnetic field pattern extending around it. The field strength decreases with distance from the borehole. The magnetic interference due to the metal in the borehole can be measured as a vector whose orientation depends on the location of the measurement point within the magnetic field. The present invention is based on the realisation that if a cylindrical bar magnet, or in this case the borehole, is viewed "end on", ie: looking down the borehole, the magnetic field vectors appear to intersect at a particular point. In other words, the magnetic field lines all intersect the longitudinal axis of the borehole.

Thus, a line intersected by all detected magnetic field vectors represents the longitudinal axis of the source of magnetic interference. Knowing the location of the longitudinal axis, the minimum distance between a well being drilled and an adjacent borehole can be determined.

In more general terms, knowing the location of the longitudinal axis of a source of a phenomenon enables an approximate determination of the distance of the source from the region where the measurements are being taken. If the azimuth and inclination of the source is already known, its position can be determined from only two measured vectors. If the azimuth and inclination are not known, three vectors will be needed to determine the position of the axis of the source with any certainty. (There are an infinite number of straight lines which will join two spatially separated straight lines but only one straight line will join three spatially separated straight lines.) For greater accuracy it will be preferable to take more than only two or three vector measurements. Then, allowing for errors, the longitudinal axis of the source will be the line which is most nearly intersected by all of the measured vectors.

In the case of a well borehole, measurements would be taken at various positions along the borehole.

It should be noted that according to the present invention it is not necessary to measure the magnitude of the phenomenon, only its orientation. Other measurable phenomena which may be used for source ranging include shock waves, sound waves, heat waves and electric fields. The only essential criterion is that the phenomenon should be "directional".

Other known ranging techniques which use magnetic field measurements require more detailed measurements, such as the magnitude and/or gradient of the magnetic field. In the present case it is not even necessary to know whether the interference field acts towards or way from the adjacent well.

A method of borehole ranging according to the invention will now be described by way of example only and with reference to the accompanying drawings in which.

Well ranging using the method of the invention does not require any special equipment. A typical downhole survey tool is typically provided with three mutually perpendicular fluxgate magnetometers for measuring flux components to generate a flux vector, and three accelerometers for taking measurements of the gravitational field at different locations down the borehole. These are usually provided in a single sensor package and sensor information is stored to memory or transmitted to the surface using MWD (measurement while drilling) techniques, or via a wire link. As already briefly noted above, the interference from the metal in an adjacent well is normally from the tubular elements within it, eg: casing, drill pipe, collars etc. The interference surrounding them is determined by the magnetism (induced and permanent) within the metal. The shape of the interference pattern is determined by the homogeneity of the magnetism and the shape of the metal.

It is normally the case that the magnetism is homogeneous within a joint of a casing, drill pipe or collars and their shape is normally rotationally symmetrical and tubular. The effect of this on the interference pattern is that it has a sense of symmetry looking down the longitudinal axis of the cylinders. The technique of the present invention makes use of this symmetry.

Objects in a well such as pipe sections etc. are often screwed together to form a long continuous cylinder. There may be parts of cylinders inside each other and other combinations of components. However, the longitudinal axis of these items lies along the wellbore path. Thus, the origin of any magnetic interference from a borehole may generally be considered to originate in cylinders in the target well. The magnetic field emanates from the cylinders as if they were cylindrical magnets.

Under normal conditions the magnetometers of a downhole tool will detect the earth's magnetic field. In the vicinity of another well they will also detect the interference field. In order to determine the interference vector at any point downhole, first the normally present earth's magnetic field must be subtracted as will be explained in more detail below.

Figure 1:
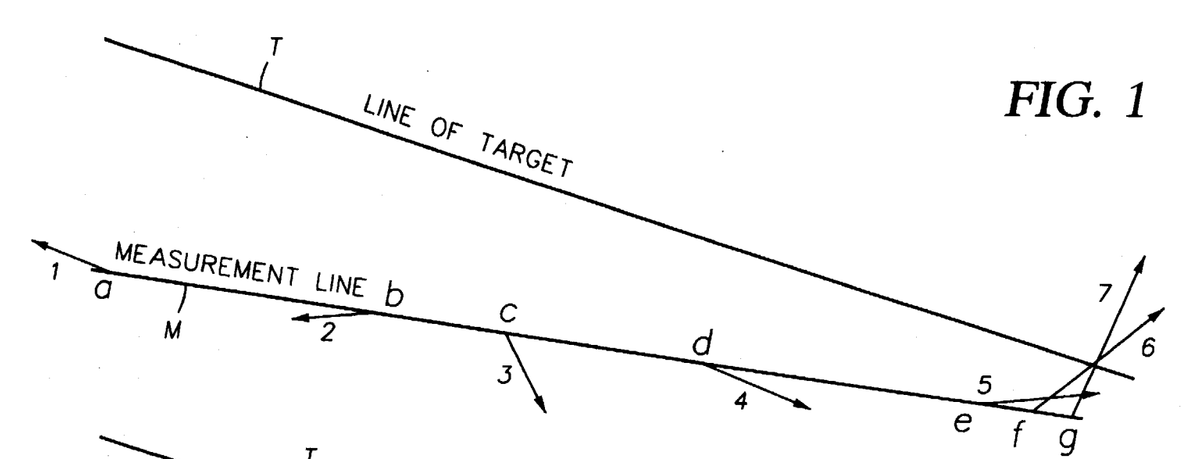
FIG. 1 illustrates the relationship between the path of a borehole from which measurements are taken, the path of an adjacent borehole, and measured magnetic interference vectors.

FIG. 1 shows the relationship between the path M of the borehole being drilled (measurement line), the line of the adjacent borehole T (target line) and the calculated interference vectors 1-7 measured at various points a-g along path M. The illustrated interference vectors are due solely to interference from adjacent borehole T. In other words the earth's field and other interference to be described below has been subtracted from the measured values.

Figure 2:
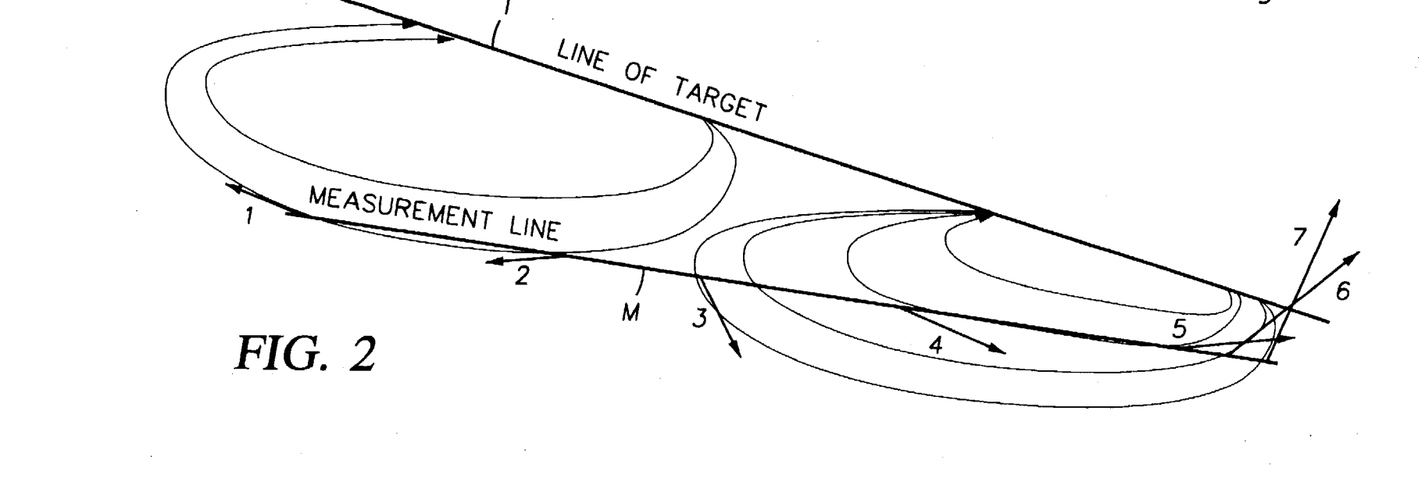
FIG. 2 illustrates the magnetic field lines from which the vectors are derived.

FIG. 2 additionally illustrates the magnetic field lines, due to "cylindrical magnets" in the target well, which cause the interference. The measured vectors are tangential to the field lines.

Figure 3:
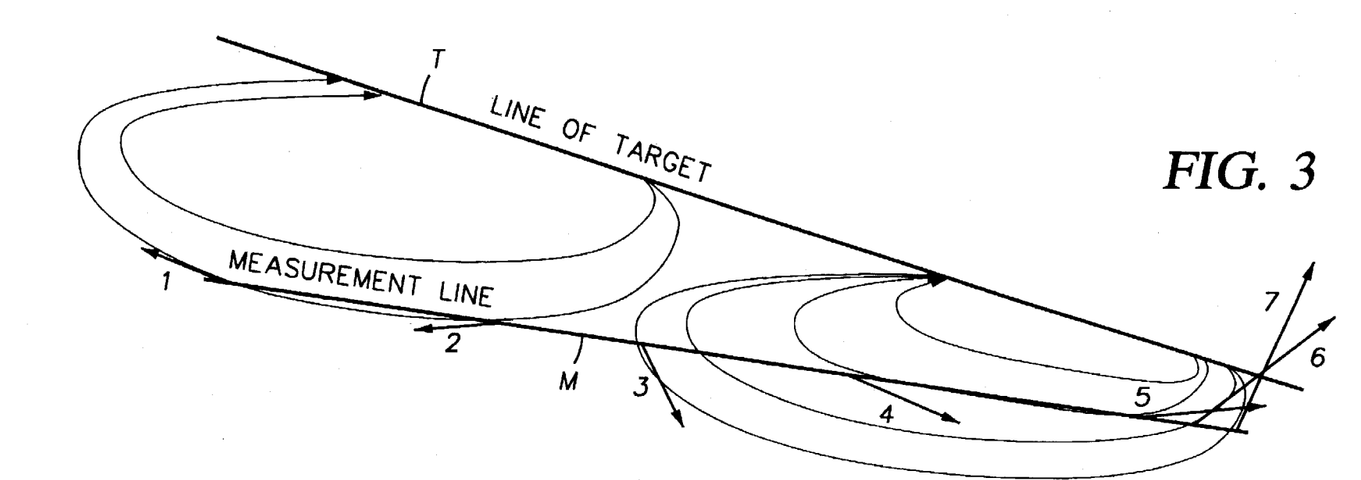
FIG. 3 shows the vectors extended.

FIG. 3 shows the interference vectors extended (shown as dotted lines). As noted above, the magnitude of the vectors does not need to be known. Thus, in this technique, each vector is extended to an infinite line in space.

Figure 4:
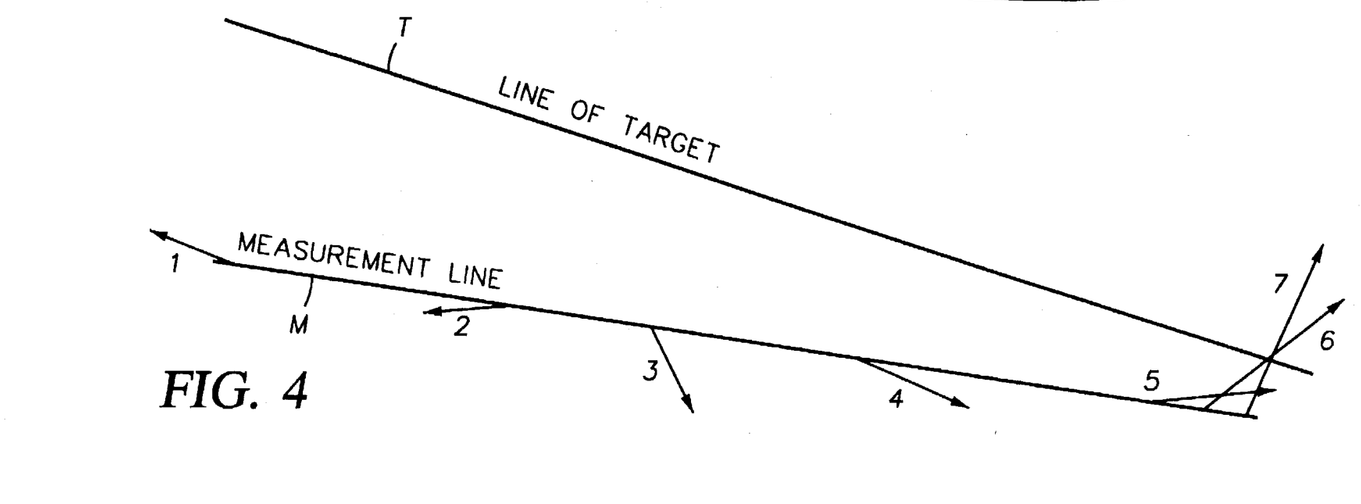
FIG. 4 corresponds to FIG. 3, omitting the field lines.
Figure 5:
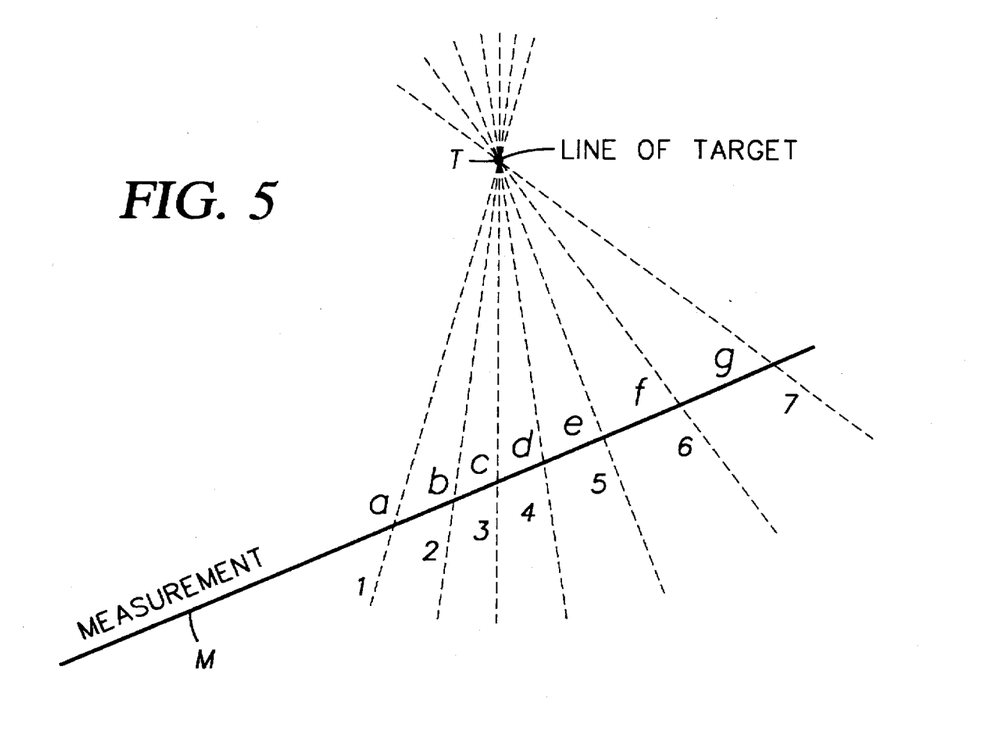
FIG. 5 shows the same features as FIG. 4, viewed instead along the line of the adjacent borehole.

Viewed in the plane of FIG. 4 (or FIGS. 1 to 3) the lines including the vectors 1-7 appear to intersect at random points in space. If the view point is changed and the lines are reviewed looking down the target line T, the vectors appear to intersect at a common point. The plane of FIG. 5 is perpendicular to the target line and the lines including the vectors all cross the target line T.

Figure 6:
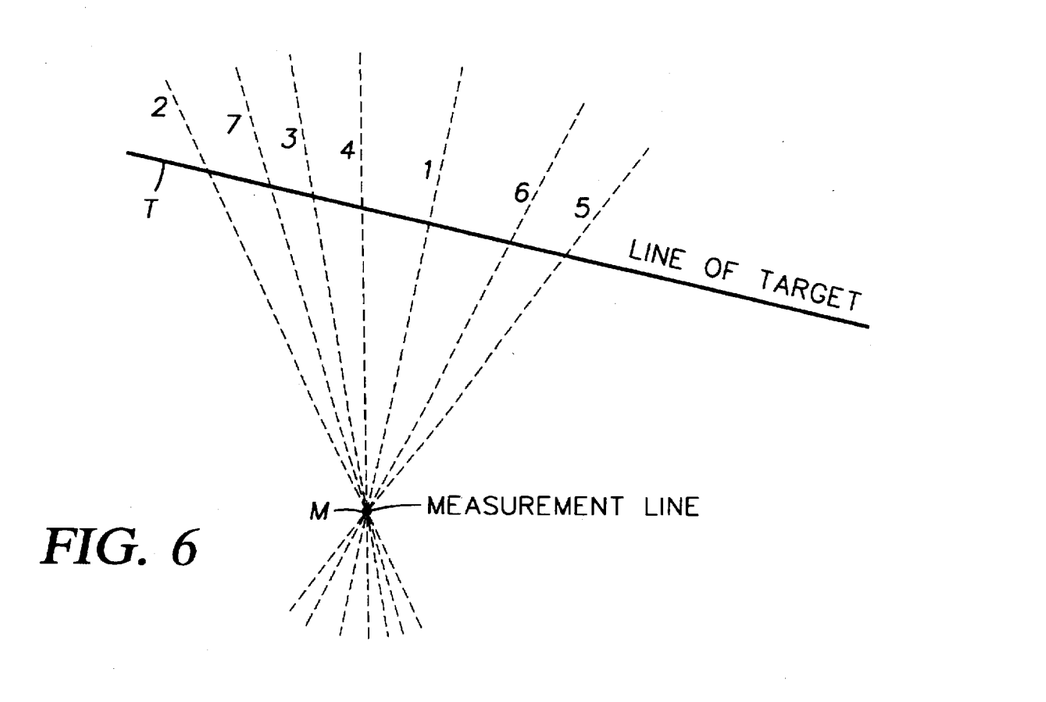
FIG. 6 shows the same features as FIG. 4, viewed instead along the "measuring" borehole.

It should be noted that the lines including the vectors also cross the measurement line M, as shown in FIG. 6 in which the measurement line M is parallel to the plane of the paper. Thus the lines including the vectors are a special set which all cross two lines, T and M.

Figure 7:
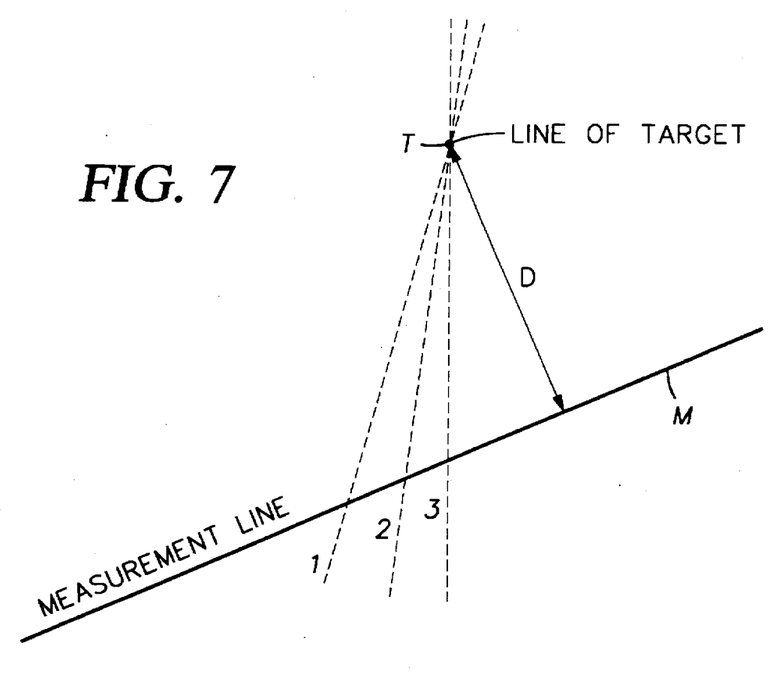
FIGS. 7 and 8 show how the displacement can be calculated once the line of the adjacent borehole is known.
Figure 8:
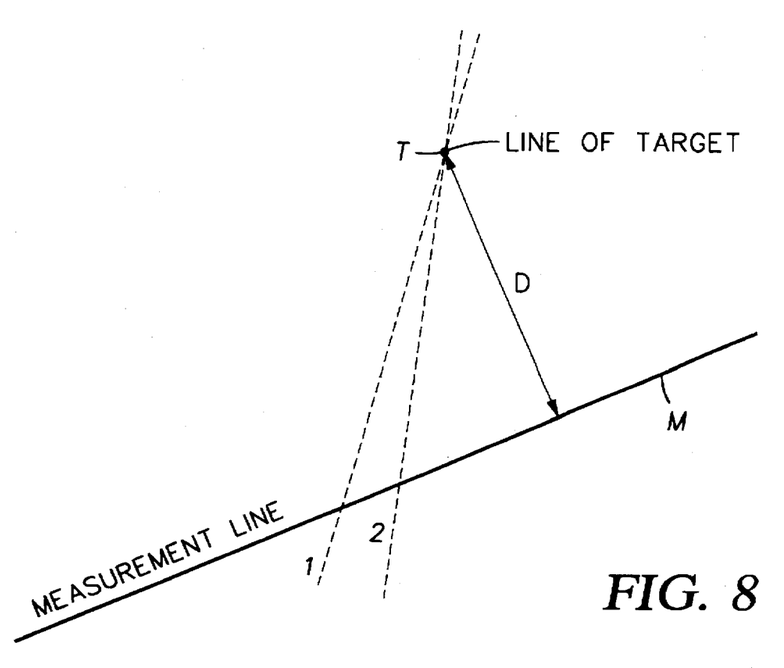

The position of M is known and therefore the position of T can be found using techniques to be described below. If no information is available on the spatial location of T, at least four vectors will generally be needed to determine the azimuth, inclination and displacement D of T from M, as shown in FIG. 7. If a parameter of the target line is already known, such as azimuth, inclination or direction, generally only three vectors will be required, although it is not guaranteed that there will be a solution. Approximation techniques would be used, as explained later on. If the azimuth and inclination are already known, a solution for T can be found with only two vectors, as indicated in FIG. 8.

Figure 9:
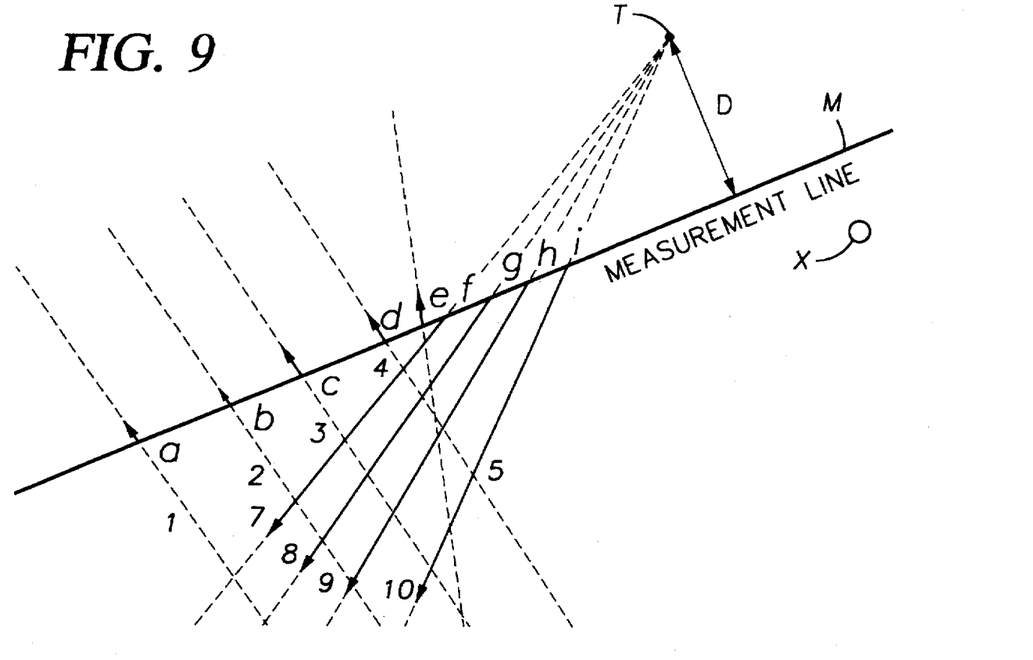
FIG. 9 shows a practical example of typical vectors which would be measured at different locations down a borehole as an adjacent well is approached.

FIG. 9 shows a practical example of a drilling operation with the interference vectors typically measured at various points a-j along the measurement line. Lines 1-10 are the extended lines which include the linear interference vectors.

Lines 1-5 are extended from interference vectors measured at points a,b,c,d,e along the measurement line M. At these points there is no appreciable influence from the target well T. The interference vectors at points a,b,c,d,e have been corrected for the effects of the earth's magnetic field and are simply due to interference from the drilling drillstring itself and inherent errors. For example, it is assumed that the measurement line follows a straight azimuth but there may in fact be slight deviations which will cause errors.

At point f on measurement line M, interference from the target well is detected and the vector extended to line 6 is due to drillstring interference, inherent errors, plus interference from the adjacent well. As drilling approaches the target well the interference becomes more marked. Lines 7,8,9,10 are extended from vectors which have been corrected for drillstring interference and inherent errors and are solely due to interference from the target well. As shown, all of the lines cross the axis of the target well which is perpendicular to the plane of FIG. 9. FIG. 9 also shows the position X at which the target well was thought to be using a gyro surveying technique.

In practice, normal surveys (readings) might be taken every 30 feet along a borehole. At the first indication of interference from an outside source it would be appropriate to reverse the tool and take additional readings between the last and present position. This will enable analysis of the position of the source of interference so that corrective action can be taken.

It should be noted that the magnetic interference can come from anywhere on the target well, it can leave the target well at any angle, and can be of any strength. It is the particular shape of the field which enables the source to be identified using the method of this invention.

The following describes some of the mathematics involved in the determination of the interference vectors and eventual calculation of the adjacent borehole location:

As noted above the drilling tool has three mutually perpendicular fluxgate magnetometers which produce measured values $H_x$, $H_y$, $H_z$, (x,y,z being the axes of the tool coordinate system) and three mutually perpendicular accelerometers which give gravitational measurements $G_x$, $G_y$, $G_z$.

Firstly it is necessary to calculate the values which would be detected by the fluxgate magnetometers if there was no interference present. This can be done using the values of $G_x$, $G_y$ and $G_z$, the total earth's magnetic field intensity, $H_o$, and the magnetic dip $\Delta$ which are known and the azimuth AZ of the measurement line which can either be measured or assumed on the basis that the measurement line is straight.

From $G_x$, $G_y$ and $G_z$ the inclination (INC) and the gravity tool face (rotational position of the tool) (GTF) can be derived from the following equations:

$$INC = ATAN \sqrt{(G_x^2 + G_y^2)} / G_z \qquad (1)$$

$$GTF = ATAN \frac{(Gx)}{(Gy)} \qquad (2)$$

Then, the values of H which would be expected with no magnetic interference can be calculated as follows:

$$H_{xc} = H_o \cos\Delta \cdot \sin AZ \cdot \cos GTF + H_o \cos\Delta \cdot \qquad (3)$$
$$\cos AZ \cdot \cos INC \cdot \sin GTF -$$
$$H_o \sin\Delta \cdot \sin INC \cdot \sin GTF$$

-continued $$H_{yc} = H_o \cos\Delta \cdot \cos AZ \cdot \cos INC \cos GTF - \quad (4)$$
$$H_o \sin\Delta \cdot \sin INC \cdot \cos GTF -$$
$$H_o \cos\Delta \cdot \sin AZ \cdot \sin GTF$$

$$H_{zc} = H_o \sin\Delta \cdot \cos INC + H_o \cos\Delta \cdot \cos AZ \cdot \quad (5)$$
$$\sin INC.$$

The interference vectors can then be calculated as follows:

$$H_{xerdi} = H_x - H_{xc}$$
$$H_{yerdi} = H_y - H_{yc}$$
$$H_{zerdi} = H_z - H_{zc}$$

where 'er' represents inherent errors, 'd' represents drill-string errors and 'i' represents outside interference.

It is usually convenient to transpose the vectors to the "world" coordinate system from the tool coordinate system using standard mathematical techniques which are readily available to those skilled in the art. However, where all that is required is a measurement of displacement relative to the drilling tool, this is not essential.

Having calculated values of $H_{xerdi}$, $H_{yerdi}$ and $H_{zerdi}$, the 'er' and 'd' components need to be separated to give the 'i' (outside interference) components. Usually the 'er' and 'd' components are constant and only the 'i' vector changes and therefore calculation of the 'i' vector is a simple matter of subtraction.

If the measurement line is approaching the target line from a distance greater than the range of influence of the interference (as shown in FIG. 9) then the initial vectors will consist only of 'er' and 'd' and can simply be subtracted once the 'i' factor comes into play.

In rare instances the measurement line may be parallel to the target line or tangential to one of the magnetic field lines, in which case the interference vector may not change at different locations along the measurement line, and no realistic determination of the position of the target line can be made. In such unusual cases the problem can be overcome by changing the measurement line direction slightly.

There may be situations where "i" is always present and it is not possible to simply calculate the factors "er" and "d" from previous measurements. In such cases it may be possible to calculate the contributions to the vector measurements due to "er" and "d" using mathematical techniques. Alternatively, drillstring interference "d" could be eliminated or reduced to an insignificant level by isolating the survey instrument, eg: distancing the survey package from steel within the measurement well or simply using a non-magnetic material in the measurement well. Inherent errors "er" can be removed by using a survey device to measure the azimuth which is not reliant on the magnetic field, such as a gyro.

Having determined the interference vectors the next step is to find the viewing plane at which the lines including the vectors appear to cross, as shown in FIG. 5. At the experimental stage of the invention, this has been done very simply using a 3-D CAD system and changing the viewing angle or viewing plane to find the plane in which the vectors appear to cross. However, it is anticipated that a computer program could be produced to do the finding automatically, possibly by an iterative process. Of course there will be errors in the calculation of the vectors and it will be a case of identifying the "best fit" as the target line. The best fit might be the line which all vectors approach most closely, which can be calculated by the program.

Once the target line has been determined, and knowing the coordinates of the measurement line from the survey tool, it is a straightforward mathematical calculation to determine the minimum distance between the two lines, equivalent to the displacement D between the two boreholes.

Figure 10:
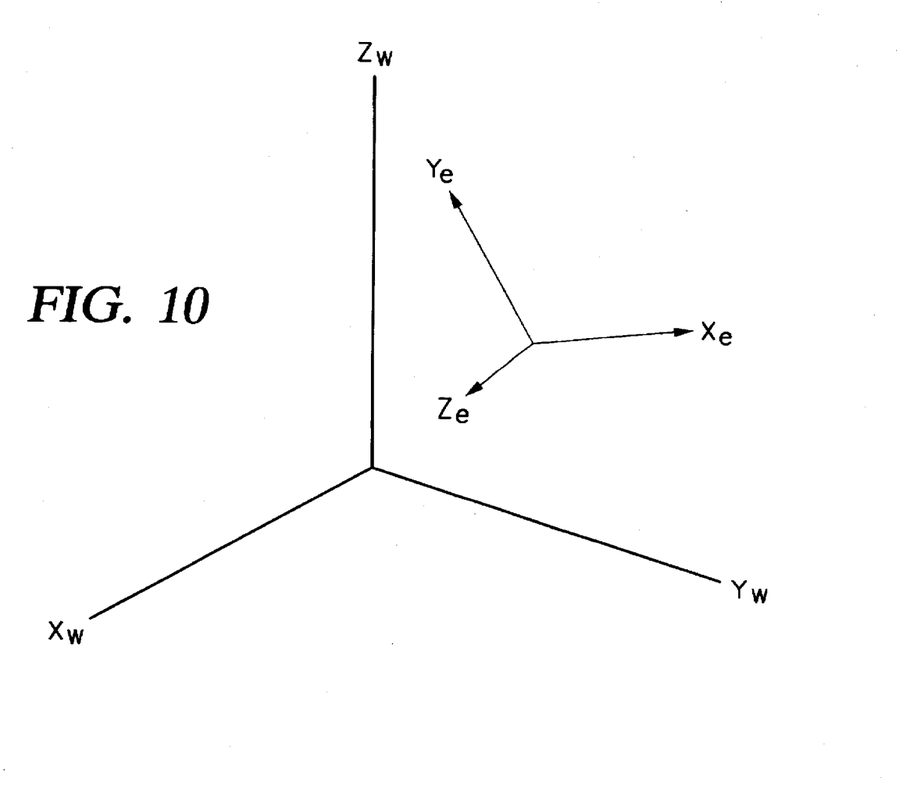
FIGS. 10, 11 and 12 are mathematical diagrams used in the explanation of the transformations which may be used to mathematically solve the target line.
Figure 11:
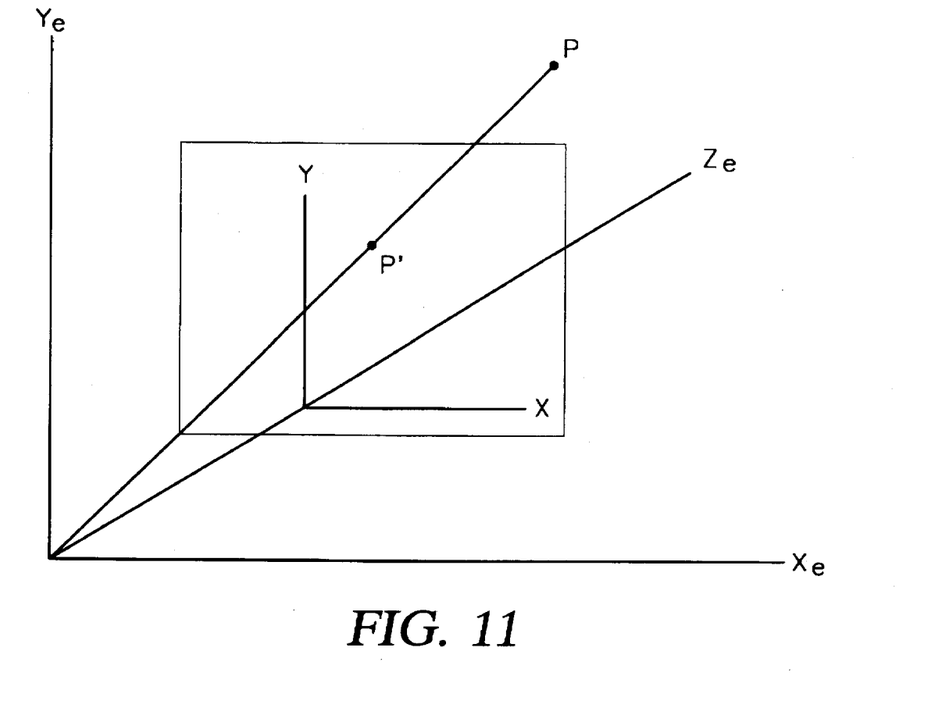
Figure 12:
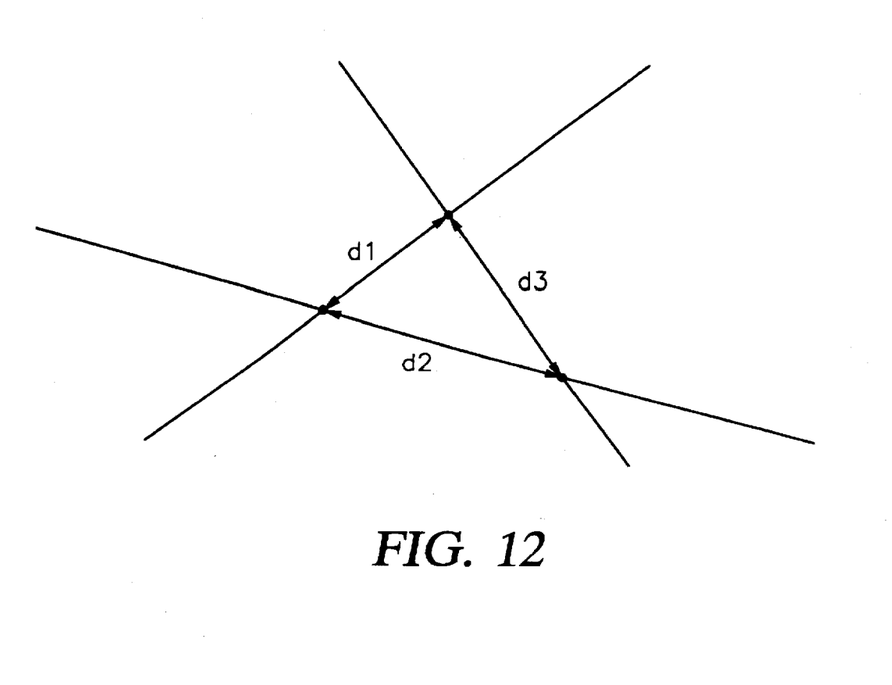

Hereinafter follows an explanation of the mathematics involved in finding the "best fit" for the interference vectors, with reference to FIGS. 10, 11 and 12.

Figure 13A:
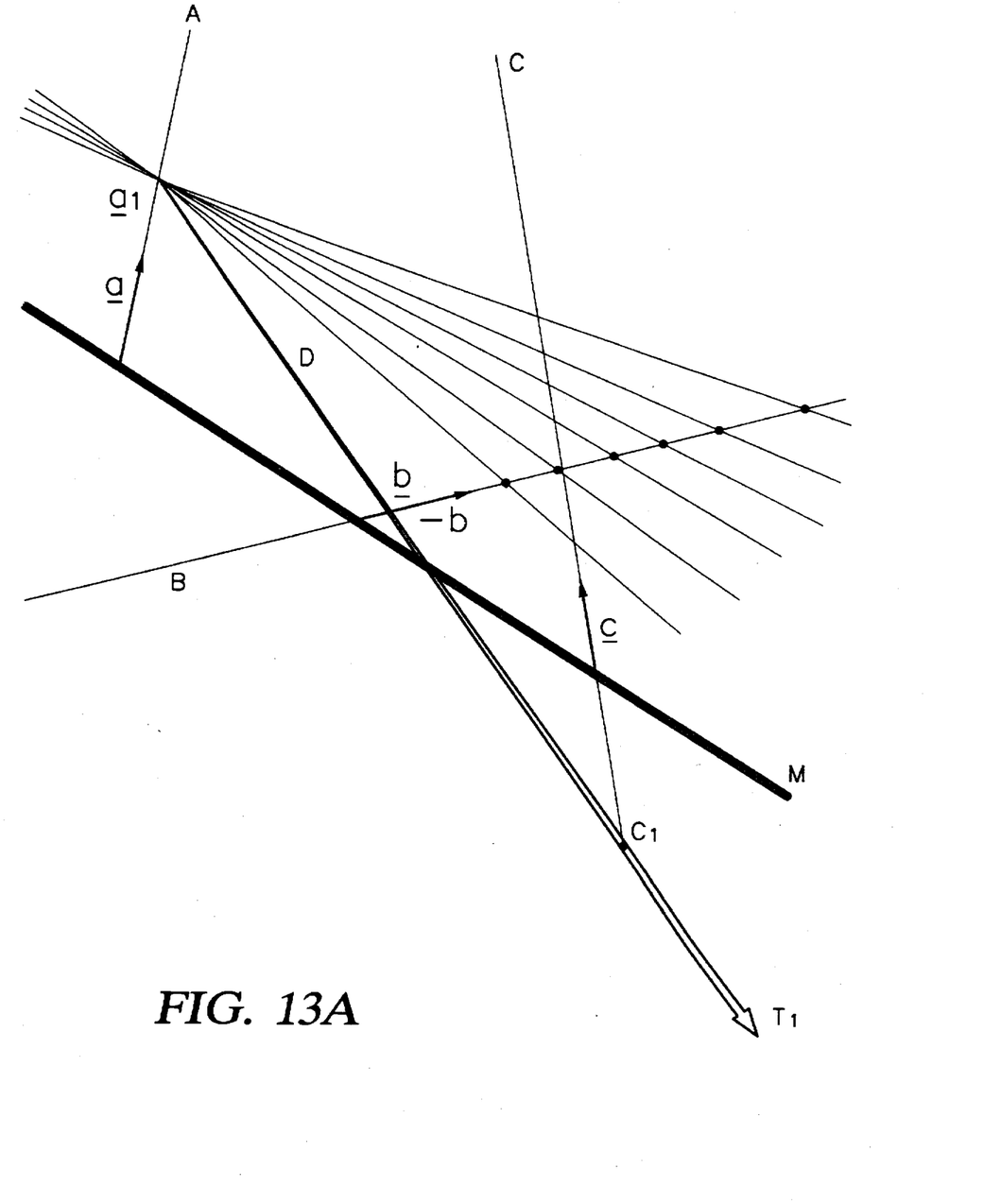
FIGS. 13a and 13b are diagrams to demonstrate that three vectors are insufficient to calculate a target line.
Figure 13B:
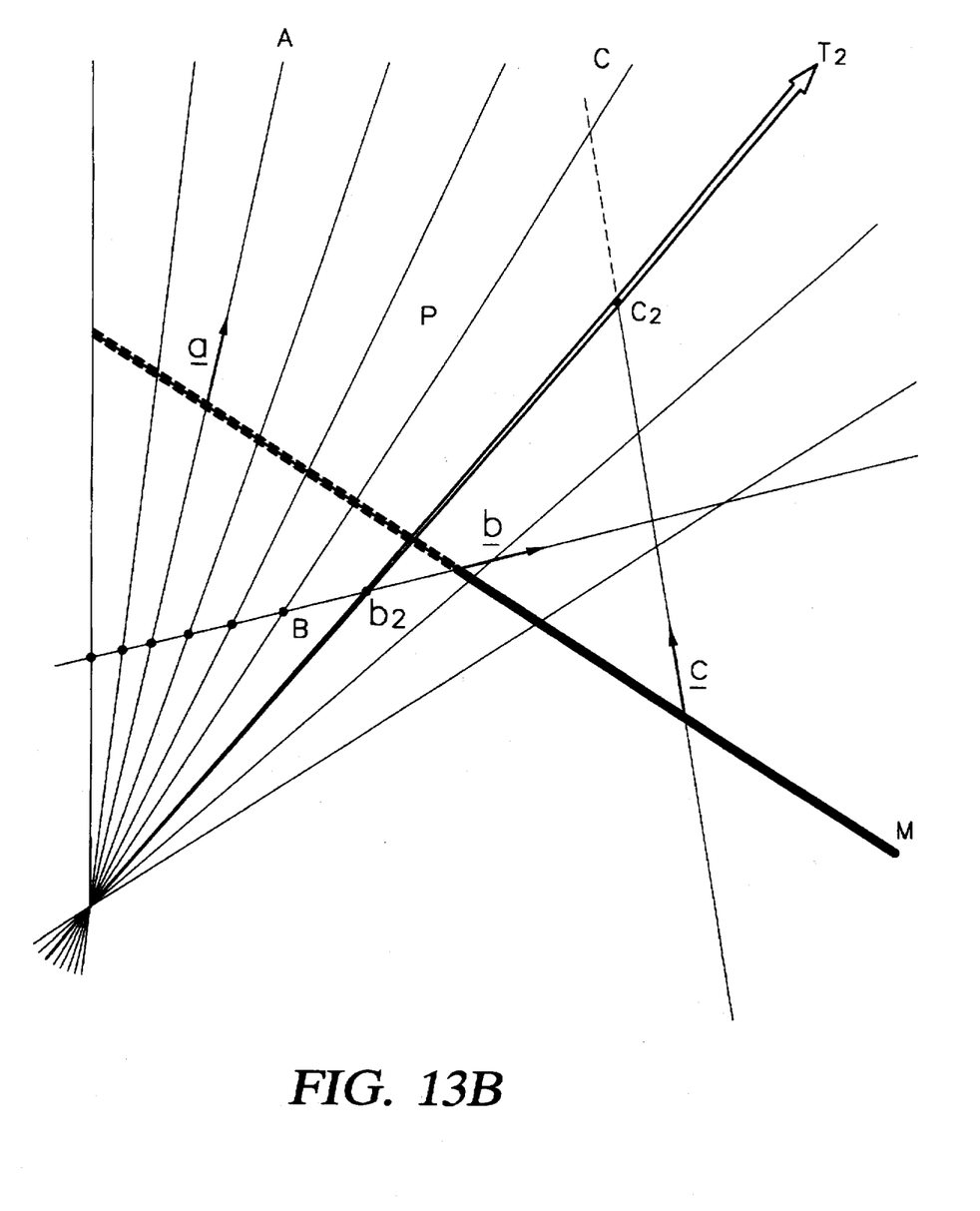

It is shown in FIGS. 13a and 13b that three vectors are not sufficient in general to unambiguously define a target line:

Given three arbitrary vectors a, b and c passing through a line M (Measured line), and three lines A, B and C representing the infinite extensions of the vectors a, b and c respectively, we wish to find a line T intersecting A, B and C.

Suppose a point is chosen arbitrarily on line A, referred to as $a_1$, and a line is then extended from $a_1$ to any point on B, there is an infinite choice of lines, all of which lie in a plane containing $a_1$ and B (see FIG. 13a), which we call plane $P_1$. It is evident that any point in $P_1$ lies on a line from $a_1$ to a point on B (except points on a line from $a_1$ in direction b). Line C also passes through plane $P_1$ (unless it is a special case and runs parallel to $P_1$) at a point referred to as $c_1$.

It is therefore clear that a line can be extended from $a_1$ through $c_1$ (in plane $P_1$), which must also at some point pass through B, at a point referred to as $b_1$.

This line therefore passes through A, B and C and therefore satisfies the requirement for T.

However, this line T is not unique as the point a was chosen; there are an infinite number of possible choices for point $a_1$ ($a_2$, $a_3$ ...) giving rise to an infinite number of possible lines T ($T_1$, $T_2$ ...). Thus T is not unique (see FIG. 13b for an example of another line $T_2$), and it is straightforward to show that there are always lines $T_a$ and $T_b$, which could be at an angle to one another of between 0 and 90 degrees.

At least 4 vectors are therefore needed to get a fixed line T representing the borehole to be located. There is no guarantee that there would be solution for a set of four vectors (apart from line M). The set of points t which could lie on any line $T_n$ in the above analysis is a non-trivial surface, and a fourth arbitrary line D would not be guaranteed to pass through it.

The basic problem is therefore the determination of the line of target from four given interference vectors emanating from the target line and measured from given measurement points on the measurement line. The target line has the property that, if we look along it, the interference vectors appear to be concurrent (i.e. pass through a common point). It is this property that will be utilised to determine the target line (FIG. 1). The search for the target line may be done computationally, with or without the aid of computer graphics. Using computer graphics does, however, provide us with an effective visual aid, and is particularly useful in establishing an initial search region, and in enabling us to decide whether the search is converging satisfactorily. We are thus faced with the problem of representing a three-dimensional object (the target vectors and measurement line) in two dimensions (the viewplane or plane of projection). If we could take a snapshot of the four vectors from a distance, along a particular direction (or line of sight), they would appear to be four straight lines in the plane of the photograph. These straight lines (extended, if necessary), would, in general, intersect at six points. To determine the target line, therefore, it is necessary to change systematically the line of sight to bring these points closer together until some specified criterion of 'convergence' has been met.

Transformations

The two-dimensional representation of three-dimensional objects requires the introduction of certain mathematical transformations.

The target interference vectors are specified by their start and finish xyz coordinates in a certain three-dimensional coordinate system. This coordinate system is known as the world coordinate system. If we wish to project the three-dimensional object on to a two-dimensional viewing plane, other coordinate systems have to be introduced, namely the three-dimensional eye coordinate systems, and the two-dimensional screen coordinate system. A point on our three-dimensional object, specified by its world coordinates ($X_w$, $Y_w$, $Z_w$), has to be mapped to a corresponding point specified by its screen coordinates (X,Y).

The mapping from world coordinates to screen coordinates is carried out in two stages. We first of all assume that our eye is in a certain position in three-dimensional space (the viewpoint). We then choose a coordinate system such that the origin is at the viewpoint, and the z-axis points to the origin of the world coordinate system (FIG. 10). This coordinate system is the eye coordinate system.

A point with world coordinates ($x_w, y_w, z_w$) is transformed to a point with eye coordinates ($x_e, y_e, z_e$). This transformation is called the viewing transformation. It may be shown that the transformation equations between coordinate systems are given by the matrix equation $$(x_e, y_e, z_e) = (x_w, y_w, z_w) V$$

where V is the viewpoint transformation matrix given by $$V = \begin{pmatrix} -\sin\theta & -\cos\theta\cos\phi & -\cos\theta\sin\phi & 0 \\ \cos\theta & -\sin\theta\cos\phi & -\sin\theta\sin\phi & 0 \\ 0 & \sin\phi & -\cos\phi & 0 \\ 0 & 0 & \rho & 1 \end{pmatrix}$$

where p, $\Theta$, and $\phi$ are the spherical coordinates of the viewpoint in world coordinate space. Alter p, $\Theta$, and $\phi$ changes the viewpoint and hence the line of sight. Thus given the spherical coordinates of the viewpoint, we can compute the eye coordinates of a point from its world coordinates.

The transformation from the eye coordinate system to the two-dimensional screen coordinate system is known as the perspective transformation. FIG. 11 illustrates this transformation.

Point P is a point in the eye coordinate system, and P' is the corresponding mapped point in the screen coordinate system. If d is the distance from eye to screen then the screen coordinates (X,Y) are given by $$X = d x_e / z_e \text{ and } Y = d y_e / z_e$$

Finding the Line of Target

From the previous discussion, we have seen how to transform a point in the three-dimensional world system to a point in the two-dimensional plane screen. Now, a target interference vector is specified by two points, namely its initial and final points specified in world coordinates. For a given viewpoint, we can now calculate the corresponding two-dimensional screen coordinates of these points. These two points on the screen plane specify a unique straight line. Thus, when we transform the four target interference vectors, we obtain four straight lines in the screen plane. The equation of these straight lines are easily obtainable, since the equation of a straight line passing through two points with screen coordinates ($X_1, Y_1$), and ($X_2, Y_2$) is $$\frac{Y - Y_1}{X - X_1} = \frac{Y_2 - Y_1}{X_2 - X_1}$$

or $$Y = mX + c$$

where m is the gradient of the straight line, and c is its intercept on the Y-axis. Our four target reference vectors, when transformed as above, thus give rise four equations $$Y = m_1 X + c_1$$

$$Y = m_2 X + c_2$$

$$Y = m_3 X + c_3$$

$$Y = m_4 X + c_4$$

where $m_1, m_2, m_3, m_4, c_1, c_2, c_3$, and $c_4$ are known constants. These equations may now be solved in pairs to produce the six points of intersection of the four straight lines.

The next step in the determination of the line of target is to vary the viewpoint/origin vector until the six points of intersection coincide or are sufficiently close. Once the convergence criterion has been met the values of $\Theta$, the inclination, and $\phi$, the asimuth provide the direction of the line of sight. We can now therefore project the projected point corresponding to target line back into world coordinates to establish the target line 4.

Some Notes on Implementation

We shall assume that initial estimates $\Theta_1$ of $\Theta$ and $\phi$ are provided. A 'viewing cone' would be set up to investigate values of $\Theta$ and $\phi$ lying between $\Theta_i \pm \Theta_m$ and $\phi_i \pm \phi_m$ for some suitable viewing distance. A grid of viewpoints can thus be established, the values of $\Delta\Theta$ and $\Delta\phi$ being chosen according to the fineness of sweep required. The sweep through the values to determine the best one can be done in a straightforward systematic way, or using a more sophisticated search algorithm. For each value of $\Theta$ and $\phi$, a convergence criterion is checked to see if it is satisfied. When it is, convergence will be assumed. There are several possible criteria which may be chosen. For instance, the 2-d variance of the intersection points could be calculated, a value of 0 meaning all lines intersect at a point.

Furthermore, the intersection points could be weighted according to the angles between the intersecting lines (projected or in real space); lines that are almost parallel will have a highly variable point of intersection depending on the accuracy to which they are known, and should have a low weighting. Conversely, intersection points of lines which are close to perpendicular should be given a high weighting.

Once this criterion has been satisfied, the search can be made finer by decreasing the viewing distance.

The convergence of the intersection points on depends on $\Theta$, and $\phi$, so that we are trying to solve $F(\Theta, \phi) = o$ computationally. A more sophisticated search algorithm such as one belonging to the quasi-Newton class of algorithms could be employed to accelerate the search.

As remarked before, the search procedure could also be implemented using interactive computer graphics. The calculations to be carried out are not complex, and the speed of present computers allied to high resolution graphics could lead to an effective means of solution using a combination of user-driven and algorithm-driven search techniques.

Shortest Distance between Measurement Line and Target Line

Once the target line has been determined, it is of interest to calculate the shortest distance between these two lines. Now, we know the directions of both lines, and we know a point on each line, so we can write the equations of the two lines in the form $$\frac{x-x_1}{l_1} = \frac{y-y_1}{m_1} = \frac{z-z_1}{n_1}$$

and $$\frac{x-x_2}{l_2} = \frac{y-y_2}{m_2} = \frac{z-z_2}{n_2}$$

where $l_1$, $m_1$, $n_1$ and $l_2$, $m_2$, $n_2$ are the direction cosines of the two lines, and $(x_1,y_1,z_1)$ and $(x_2,y_2,z_2)$ are points on each line respectively. The direction ratios of the common perpendicular are $$(m_2n_2-m_2n_1):(n_1l_2-n_2l_1):(l_1m_2-l_2m_1)$$

and using simple analytic geometry, it is straightforward to calculate the length of this common perpendicular (i.e. the shortest distance between the two lines).

As briefly noted in the introduction, above, the technique of the present invention could be used to locate targets emitting other fields. Other examples include seismic fields, alternating electromagnetic fields and possibly even gravitational fields.

It should also be noted that the technique has many other applications apart from oil and gas exploration. For example, parallel wells are often used in the creation of impermeable (ground freeze, grouting) barriers and permeable (drainage) barriers. If a "target" well contains no metal, a metal target could be placed in it to enable it to be located. This way, the target could be moved while the measuring point remained fixed.

Parallel wells are used in the explosives industry for trimming of rock faces and bulk blasting to pre-fractured boundaries. It is normally important for the relative displacement and the position of these wells to be known to create effective trims and contain a bulk blast to prevent it from fracturing adjacent rock.

Wells or boreholes are also used in the creation of tunnels, such as underneath rivers. A "target" could be placed on a river bed to ensure that a borehole was always a predetermined distance beneath the earth's surface.

I claim:

1. A method for determining the direction and position of a subterranean formation structure, the structure having a magnetic field, comprising the steps of:

measuring a reference magnetic field at a point in said formation distant from said structure;

measuring a total magnetic field at a point in said formation at a point proximate to said structure;

determining a component of the total magnetic field attributable to said structure based on said reference magnetic field;

repeating the steps of measuring the total magnetic field and determining the component attributable to said structure at at one or more additional points proximate to said structure;

generating a set of extended lines corresponding to extended magnetic field vectors attributable to said structure at each point, determining a spatial vector which passes closest to all of said extended lines, said spatial vector corresponding to the axis of said structure.

2. The method of claim 1 wherein said structure is a borehole.

3. The method of claim 1 wherein said total magnetic field is measured at three points and a known parameter of the structure is used in determining said spatial vector.

4. The method of claim 1 wherein said total magnetic field is measured at two points and two known parameters of the structure are used in the determining said spatial vector.

5. The method of claim 1 wherein said total magnetic field is measured at more than three points.

6. The method of claim 2, wherein said borehole is a cased borehole.

7. The method of claim 1 wherein the step of determining said spatial vector includes graphically determining said spatial vector based on said extended lines.

8. The method of claim 1 wherein the step of determining said spatial vector includes the steps:

(a) making an initial estimate of an inclination angle and an azimuth angle for said structure;

(b) determining a convergence zone of said extended lines based on said estimated inclination angle and azimuth angle;

(c) comparing said convergence zone to a predetermined criteria;

(d) modifying said structure inclination angle and azimuth angle estimates based on an error between said convergence zone and said predetermined criteria and repeating steps (b) and (c) until said convergence zone is within said predetermined criteria.

9. A method for determining the location and direction of a target well borehole penetrating an earth formation from an adjacent well, comprising the steps of:

positioning a magnetic field measurement instrument in said adjacent well distant from said target well borehole and measuring a reference magnetic field;

positioning a magnetic field measurement instrument at a known location in said adjacent well, said position being proximate to said target well borehole;

measuring a total magnetic field at said location;

determining a magnetic field component attributable to said target well borehole;

positioning said instrument at at least one additional known location in said adjacent well;

repeating the steps of measuring said magnetic field and determining said magnetic field component attributable to said target well for each additional location in said adjacent well;

generating a magnetic field vector for each location, each of said vectors corresponding to said magnetic field component attributable to said target well borehole; and determining the location and direction of said target well borehole as a function of said magnetic field vectors.

10. The method of claim 9, wherein the step of determining the location of said target well borehole includes prior knowledge of an azimuth angle and an inclination angle for the target well borehole.

11. The method of claim 9, wherein the step of positioning said instrument at at least one additional location, includes the steps of measuring the magnetic field and determining the magnetic field component attributable to said target well borehole at two additional locations, wherein the target well borehole azimuth angle or dip angle is known.

12. The method of claim 9, wherein the step of positioning said instrument at at least one additional location, includes the steps of measuring the magnetic field and determining the magnetic field component attributable to said target well borehole at a minimum of three additional locations.

13. The method of claim 9 wherein the step of determining the location of said target well borehole includes graphically determining the location and direction of the target well borehole based on said magnetic field vectors.

14. The method of claim 9 wherein the step of determining the location of said target well borehole includes the steps of:

(a) making an initial estimate of an inclination angle and an azimuth angle for the target well borehole;

(b) determining a convergence zone for said magnetic field vectors based on said estimated inclination angle and azimuth angle;

(c) comparing said convergence zone to a predetermined criteria;

(d) modifying said structure inclination angle and azimuth angle estimates based on an error between said calculated convergence and said predetermined criteria and repeating steps (b) and (c) until said convergence zone is within said predetermined criteria.

15. The method of claim 9 wherein said target well borehole is a cased borehole.

* * * * *